April 11, 1939.　　　　G. A. ALBERT　　　　2,153,532
INSULATION FOR ELECTRICAL APPARATUS
Filed July 2, 1935　　　2 Sheets-Sheet 1

INVENTOR.
GERARD A. ALBERT
BY
A. D. Caesar
Charles W. Rivise
ATTORNEYS

April 11, 1939.　　　　G. A. ALBERT　　　　2,153,532
INSULATION FOR ELECTRICAL APPARATUS
Filed July 2, 1935　　　2 Sheets-Sheet 2

INVENTOR.
GERARD A. ALBERT
BY
ATTORNEYS

Patented Apr. 11, 1939

2,153,532

UNITED STATES PATENT OFFICE 2,153,532

INSULATION FOR ELECTRICAL APPARATUS

Gerard A. Albert, Kennett Square, Pa., assignor to National Vulcanized Fibre Company, Wilmington, Del., a corporation of Delaware Application July 2, 1935, Serial No. 29,452

2 Claims. (Cl. 175—41.5)

This invention relates to insulation for electrical apparatus and has particular reference to insulation for radio apparatus such as for example, condensers, tube sockets, switches and structural parts.

The inventive thought or concept is particularly well adapted to be applied in the construction of variable air condensers of the rotor and stator type. Hence, the invention will be described with particular reference to this type of electrical equipment, but it is to be distinctly understood that the disclosure is being made chiefly by way of illustration and that the claims are therefore not to be restricted beyond what is required by the state of the prior art.

Every variable air condenser requires that one set of its plates be insulated from the other so that, when it is connected to a source of alternating current, a dielectric field will be set up between the stator and rotor plates. This dielectric field will alternate with the source of current and since it passes through the insulation which holds the stator plates, power will be dissipated in this insulation. This dissipated power will manifest itself physically in the form of heat in the insulation and electrically in the form of ohmic resistance added in series with the condenser. The magnitude of this series resistance will depend upon the amount of power dissipated in the insulation, good insulation producing a smaller series resistance than poor insulation.

The selectivity of a radio receiving set depends upon the magnitude of the resistance in the tuned coil-condenser circuit. Hence, any undue resistance that is added to this circuit, as by a poorly designed inductance coil or a tuning condenser equipped with poor insulation is very undesirable. For this reason, in designing a radio condenser it is necessary to devote considerable attention to the selection of insulating material. It can readily be shown that the added series resistance due to dissipated power in the insulation is proportional to the loss factor of the insulation. Hence, insulating materials are generally tested to determine their loss factor and power factor. Power factor is the loss factor divided by the dielectric constant of the particular insulation.

It is the common practice in the art to make measurements of the power factor and loss factor of solid insulating materials between electrodes placed symmetrically on opposite faces of the sample. In the case of laminated materials the power factor and loss factor measurements are accordingly made with the dielectric field perpendicular to the laminations. However, in using this material, it is invariably disposed in such a manner that the resulting alternating dielectric fields are parallel to the laminations. For homogeneous materials as hard rubber, glass, pyralin, isolantile, etc., which do not have definite layers or laminations, the values of power factor and loss factor obtained with the field perpendicular to the faces of the specimen will be the same as the values obtained with the field parallel to the faces. Hence, it is immaterial how these materials are disposed in a piece of electrical apparatus. However, this is not true for heterogeneous or laminated material such as indurated fibre of the type previously mentioned. In the case of layers of fibrous materials impregnated with resinoids, there exist distinct layers of impregnated material and solid resin, which constitute dielectrics of different properties. Hence, these materials will have different dielectric properties when the combination is tested in parallel from what they will have when tested in series. For instance, the power factor of grade 209 "Phenolite"* is .027 perpendicular to the laminations and .054 parallel to the laminations, a difference of over 100%. This means that in electrical apparatus such as radio condensers of the prior art the "Phenolite" insulation placed into the radio circuit has a power factor not of .027 as determined by the A. S. T. M. procedure but exactly twice that amount, due to the fact that the material was tested one way and installed in another. Likewise, the loss factor of the material as installed in the apparatus is actually 130% higher than that obtained in using the conventional A. S. T. M. method of determining the loss factor. In the case of a certain grade of vulcanized fibre (Peerless) the loss factor parallel to the laminations was found to be 180% over that perpendicular to the laminations.

The principal object of the invention is to provide an electrical device or apparatus in which the power losses in the insulation are reduced to a minimum.

Another important object of the invention is to reduce to a minimum the power losses in the insulation of a radio condenser.

In its broadest aspect the inventive thought or concept resides in so disposing the laminated insulation in the electrical apparatus that the resulting dielectric field will be at right angles to the laminations instead of parallel thereto as in the prior art. In this way the amount of power

*"Phenolite" is a trade-mark used by the National Vulcanized Fibre Co., of Wilmington, Del., to identify its laminated products made from layers of fibrous material bonded by resinoids.

dissipated is reduced by at least fifty per cent in most cases. In the case of radio condensers this innovation greatly increases the sensitivity of the tuning and prevents relatively large decreases in sensitivity due to increases in humidity. A large number of determinations on "Phenolite" indicates that the loss factor parallel to the laminations increases as much as 1300% when the material becomes wet while the loss factor perpendicular to the laminations increases about 400%. Furthermore, in the case of synthetic resin impregnated material the effect of cold flow is greatly minimized.

The inventive concept is capable of being embodied in various mechanical forms, several of which have been selected for the purpose of illustrating the invention. Referring briefly to the drawings, Figure 1 is a top plan view of a condenser, partly in section as indicated by the line 1—1 in Figure 2;

Figure 1:
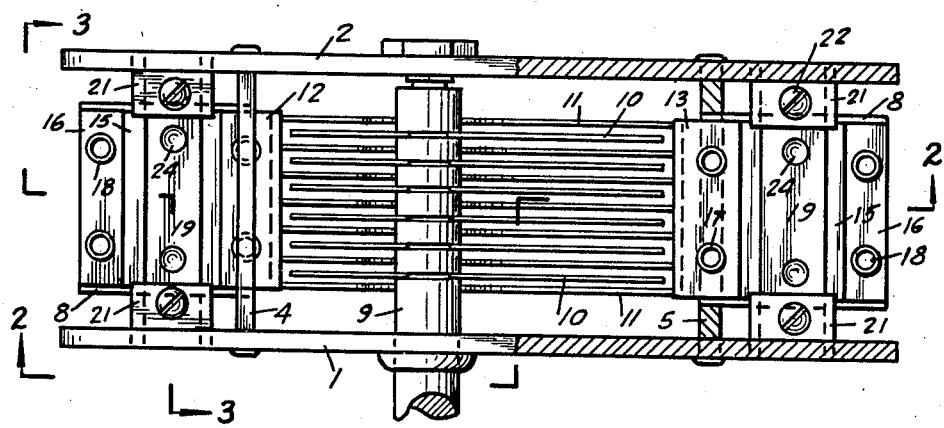
Figure 2:
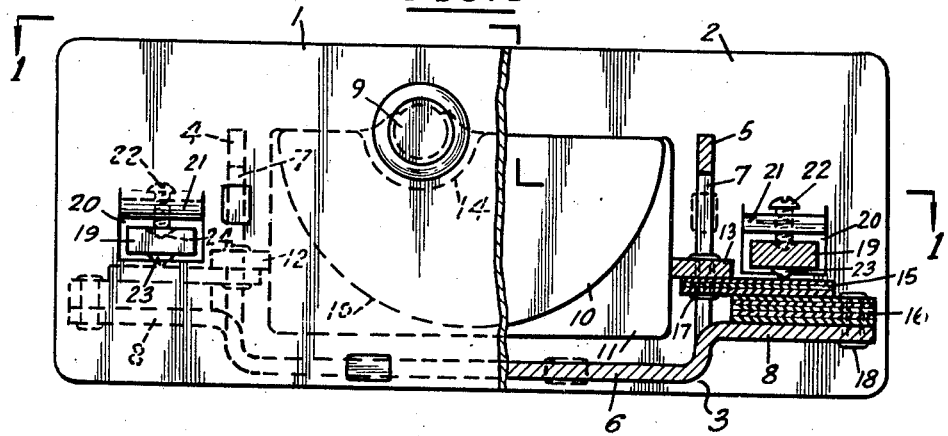
Figure 2 is a front view of the condenser of Figure 1, partly in section as indicated by the line 2—2 in Figure 1.
Figure 3:
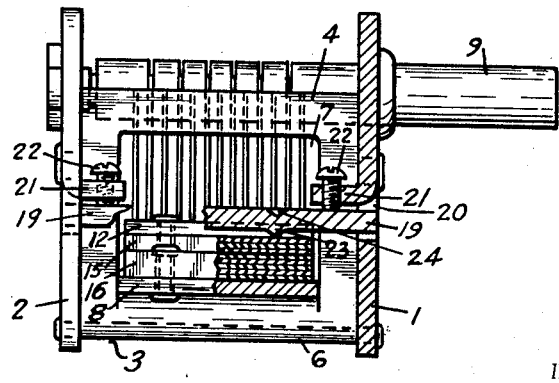
Figure 3 is an end view, partly in section as indicated by the line 3—3 in Figure 1.

Referring in greater detail to the drawings and more particularly to Figures 1, 2 and 3 thereof, it will be noted that the main frame of the condenser consists of the front and rear plates 1 and 2 and the interposed U-shaped member 3 which together provide a housing or casing for the rotor and stator plats of the condenser as will hereinafter be pointed out. The U-shaped member which may be secured to the front and rear plates in any suitable manner consists of the two end walls 4 and 5 and the bottom 6. Each of the end walls is provided with an opening or window 7 formed by punching out the tongue 8. Each of the tongues 8 is bent at right angles to the end walls for a purpose which will appear as the description proceeds. The housing or casing is of conducting material such as metal as is usual in the art.

Journalled in the front and rear plates is a rotor shaft 9 on which is mounted a series of spaced rotor plates 10. As is usual in the art the rotor plates may be semi-circular in shape and the shaft may be eccentrically disposed in relation thereto. Interspersed in interleaved with the rotor plates is a series of stationary or stator plates 11. The stator plates are shown to be generally rectangular in shape and are connected at each end in any suitable manner to the end plates 12 and 13. Each of these connecting plates is of conducting material such as metal and is horizontally disposed so as to extend through the opening 7 in the corresponding end wall of the U-shaped member. It is to be noted that each of the stator plates has a cut-out portion 14 to provide suitable clearance for the rotor shaft and to prevent metallic contact between the stator plates and the rotor shaft. Each of the tongues 8 and the connecting plates 12 and 13 are connected together and insulated from each other by the two interposed horizontally disposed rectangular plates 15 and 16 of laminated material. The insulation material is preferably indurated fibre such as vulcanized fibre or fibrous material coated or impregnated with a resinoid material such as "Bakelite" or other heat-hardenable artificial plastic. In practice I have found "Phenolite" manufactured by the National Vulcanized Fibre Co. of Wilmington, Delaware to be eminently suitable for the purposes of the present invention.

The plate 15 is shown as being permanently secured to the connecting plate 12 or 13 by means of a double-ended rivet 17 while the plate 16 is secured in a similar manner (rivet 18) to the tongue 8. The two insulating plates are not physically connected but are tightly pressed or clamped together by means of the strap 19 which may advantageously be of metal such as steel.

The strap 19 is preferably secured detachably to the front and rear plates 1 and 2 in a manner now to be described. Each of these plates is provided with two apertures or windows 20, one for each strap. These windows may be formed by punching out the tongues 21, the tongues being bent inwardly parallel to the strap 19. Each tongue is provided with an aperture to receive the screw 22. The screws 22 serve to press the strap 19 against the insulation plates 15 and 16 in order to clamp them together against relative movement. The clamping pressure may be adjusted by rotating the screws. It is to be particularly noted that the straps do not rest flat upon the upper insulating plates 15 but are slightly raised above them by means of the spaced protuberances 23. In this way it has been found possible to greatly minimize leakage between the metallic connecting plates 12 and 13 and the clamping straps 19. The protuberances 23 may be formed in any suitable manner as by means of an indenting punch. The reference numeral 24 designates the indentations on the upper surface of the straps which are formed in this operation.

Figures 4, 5:
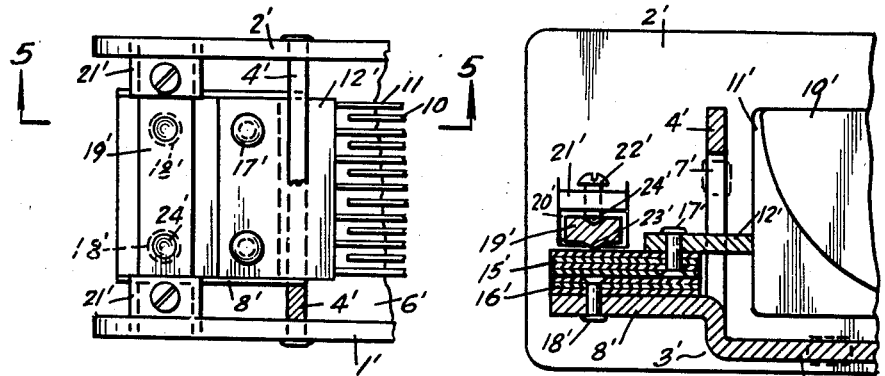
Figure 4 is a fragmentary plan view of a modified form of condenser embodying the inventive thought.
Figure 5 is a section taken on line 5—5 of Figure 4.

In the embodiment of the invention thus far described the two insulating plates 15 and 16 are disposed in offset relationship, the upper plate extending partly through the window 7. In this way I have found it possible to minimize the amount of insulation in the direct field between the connecting plates 13 and the tongues 8. The second embodiment of the invention differs from the first in that the two insulating plates, which are designated in Figure 5 as 15' and 16', are coextensive and neither of them extends through the aperture or window which is here designated as 7'. The other elements in Figures 4 and 5 are also designated with the same numeral as in Figures 1, 2 and 3 followed by a prime. The drawback to the second embodiment of the invention is the additional amount of insulation in the direct field between the connecting bar 12' and the tongue 8'. For most purposes this drawback is of minor importance.

Figure 6:
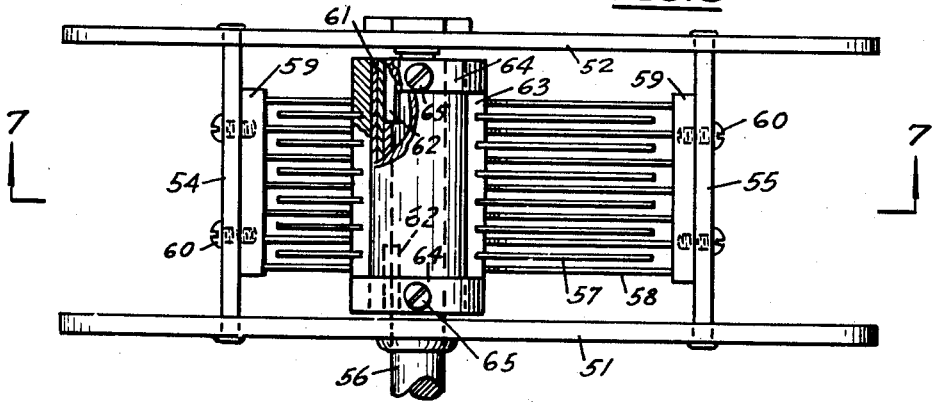
Figure 6 is a plan view of still another embodiment of the invention, partly broken away to reveal otherwise hidden parts.
Figure 7:
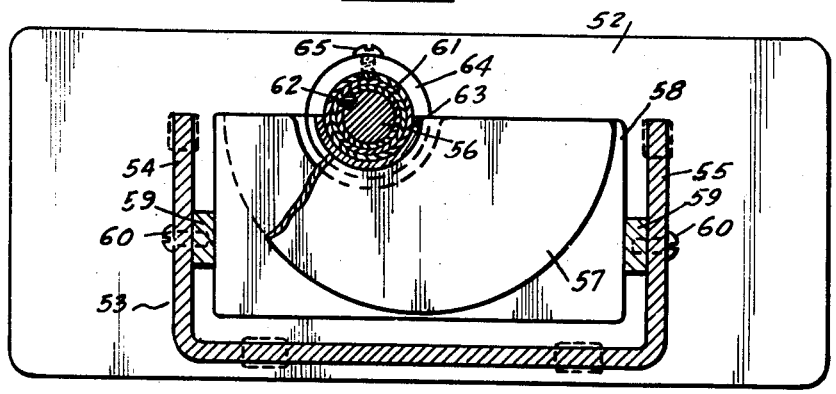
Figure 7 is a sectional view taken along line 7—7 of Figure 6, one of the stator plates being partly broken away.

Referring now to the embodiment of the invention shown in Figures 6 and 7, the frame of the device is shown as consisting of the front and rear plates 51 and 52 and the interposed U-shaped member 53, which together provide a housing or casing for the plates of the condenser. The end walls of the condenser are designated as 54 and 55. The rotor shaft 56 is journalled in the front and rear plates 51 and 52. The rotor plates are designated by 57 and the stator plates by 58. All the stator plates are connected at each end to a common metallic bar 59 which is in turn secured by means of rivets 60 to one of the end walls 54 or 55. Hence, the stator plates are not insulated from the frame or casing. This renders it necessary to insulate the rotor plates as a unit from the frame or casing. This is accomplished by interposing a tube of laminated insulating material between the rotor plates and the rotor shaft. The tube of insulating material is designated as 61 and is detachably secured to the shaft by means of one or more wedge-shaped keys 62. Preferably I employ two wedges, each inserted from an end of the shaft. All the rotor plates 57 are secured to a sleeve 63 which is slipped onto the shaft 56 over the tube 61. As illustrated the sleeve 63 may be semicircular for most of its length terminating in the two circular collars 64. The sleeve 63 may be detachably secured to the tube of insulating material by means of the screws 65 which extend only part way into the insulating tube in order to prevent electrical contact between the collars 64 and the shaft 56. The tube 61 may be of similar material to that of which the insulating plates 15 and 16 are made.

The foregoing specification and description embody the distinctive concept which characterizes this invention, but it is to be understood that the essence of the invention besides being capable of being embodied in other forms may be modified in various ways or combined with various other concepts and details without departing from the spirit of the invention or the scope of the appended claims in which I intend to claim all the patentable novelty inherent in the invention.

I claim:

1. In a radio condenser consisting of a frame comprising a front plate, a rear plate and end plates connecting said front and rear plates, a rotary shaft journalled in said front and rear plates, a series of parallel conducting plates mounted on said shaft for rotary movement with said shaft, a series of stationary plates interspersed with said rotary plates, and means for mounting and insulating said stationary plates from the frame, said means consisting of a conducting plate connecting said stationary plates at opposite ends and extending through an aperture in the corresponding end plate, a second conducting plate secured to each end plate and extending parallel to the first conducting plate, and a plurality of laminations of insulating material disposed between the first and second conducting plates with the laminations parallel to said plates, whereby the resulting dielectric field between the stationary plates and the frame is substantially perpendicular to the laminations.

2. In a radio condenser consisting of a frame comprising a front plate, a rear plate and end plates connecting said front and rear plates, a rotary shaft journalled in said front and rear plates, a series of parallel conducting plates mounted on said shaft for rotary movement with said shaft, a series of stationary plates interspersed with said rotary plates, and means for mounting and insulating said stationary plates from the frame, said means consisting of a conducting plate connecting said stationary plates at opposite ends and extending through an aperture in the corresponding end plate, a second conducting plate secured to each end plate and extending parallel to the first conducting plate, and a plurality of unconnected, contacting plates of laminated insulating material disposed between the first and second conducting plates with the laminations parallel to said plates, whereby the resulting dielectric field between the stationary plates and the frame is substantially perpendicular to the laminations.

GERARD A. ALBERT.